United States Patent [19]

Smith

[11] Patent Number: 5,407,173
[45] Date of Patent: Apr. 18, 1995

[54] VALVE FOR GAS BURNING TORCH

[75] Inventor: Loren Smith, Gainesville, Ga.

[73] Assignee: The Lincoln Electric Company, Cleveland, Ohio

[21] Appl. No.: 204,958

[22] Filed: Mar. 2, 1994

[51] Int. Cl.6 .................... F16K 25/00; F16K 31/50; F16K 41/04
[52] U.S. Cl. ........................... 251/86; 251/85; 251/214; 251/278; 251/322; 251/323
[58] Field of Search ............... 251/82, 83, 84, 85, 251/86, 88, 214, 264, 276, 278, 321, 322, 323, 335.2, 335.3

[56] References Cited

U.S. PATENT DOCUMENTS

| | | | |
|---|---|---|---|
| 1,173,728 | 2/1916 | Milne | 251/88 |
| 2,001,251 | 5/1935 | Irving | 251/335.3 |
| 2,617,621 | 11/1952 | Hobbs | 251/335.3 |
| 2,841,167 | 7/1958 | Jacobson | 251/86 |
| 3,117,762 | 1/1964 | Bartlett | 251/88 |
| 3,148,700 | 9/1964 | Friedell | 251/322 |
| 3,341,169 | 9/1967 | Webb | 251/86 |
| 3,356,335 | 12/1967 | Koch et al. | 251/264 |
| 3,491,789 | 1/1970 | Callahan, Jr. et al. | 137/340 |
| 4,201,366 | 5/1980 | Danko et al. | 251/335.3 |
| 4,911,412 | 3/1990 | Danko | 251/335.3 |

Primary Examiner—George L Walton
Attorney, Agent, or Firm—Vickers, Daniels & Young

[57] ABSTRACT

A valve for controlling the flow of a gas in a gas burning torch comprises a housing having a flow passageway therethrough, a valve seat in the passageway, and a valve stem carrying a ball valve element for engaging and disengaging the valve seat to respectively close and open said passageway. A rotatable operating knob for displacing the valve stem is isolated therefrom by a ball thrust bearing, and the valve stem is supported in the housing for rocking movement transverse to the stem axis.

35 Claims, 4 Drawing Sheets

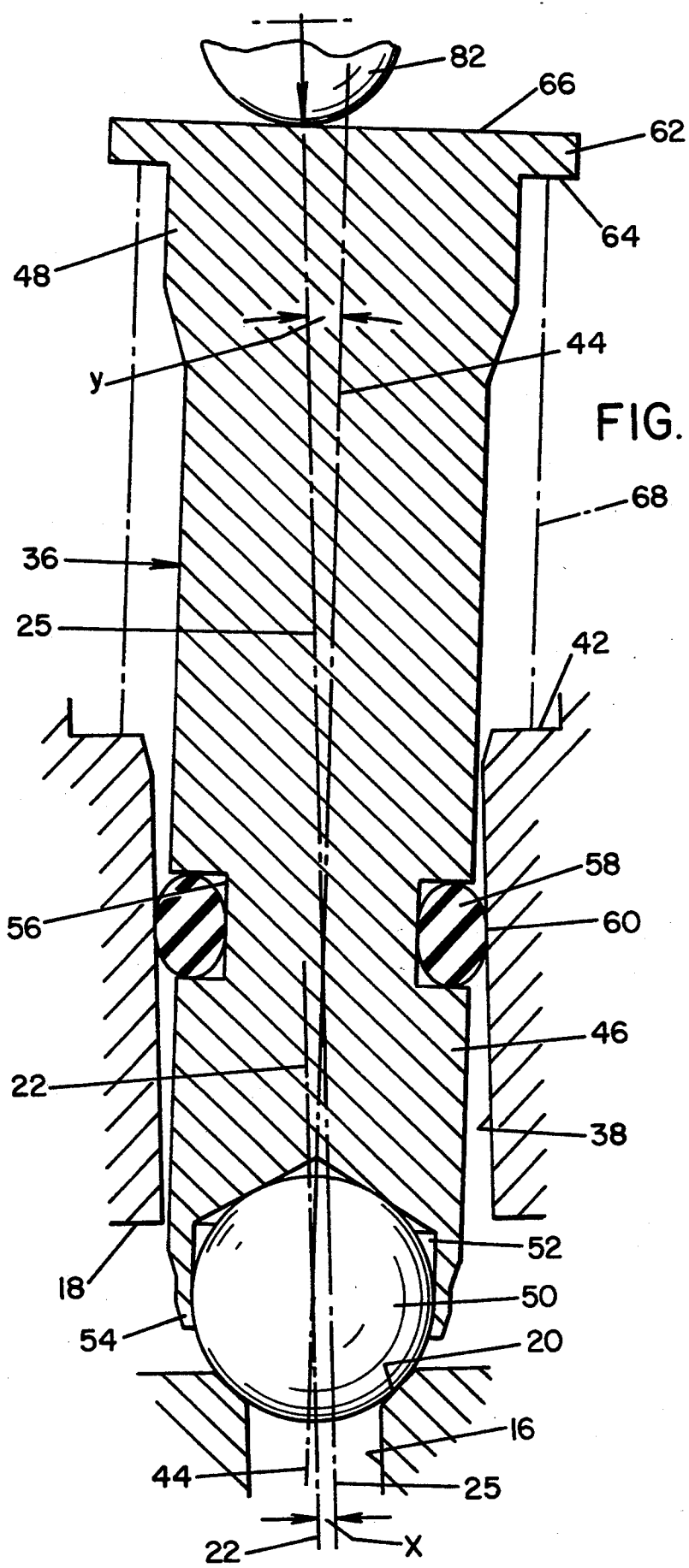

VALVE FOR GAS BURNING TORCH

BACKGROUND OF THE INVENTION

This invention relates to the art of gas burning torches for welding, cutting and the like and, more particularly, to an improved valve for controlling the flow of a gas in such a torch.

It is of course well known to provide a gas burning torch for welding, cutting or the like with a flow control or throttling valve which is manually adjustable to control the flow of preheat oxygen in a cutting torch or cutting attachment, or to control the flow of oxygen for mixture with a fuel gas such as acetylene to provide a combustible mixture in connection with use of the torch for welding. Heretofore, as shown in U.S. Pat. No. 3,255,803 to Hach et al, for example, such manually operable flow control valves have included a rotatable valve stem which is threadably interengaged with a threaded bore provided therefor in a valve housing. The outer end of the stem is axially splined to receive an operating knob by which the stem is rotated and an adjustable packing is provided about the stem between the housing and a bonnet member threatedly mounted on the housing. Rotation of the valve stem displaces the valve element end thereof into and out of engagement with a seat in a flow passageway through the housing to respectively close and open the passageway to the flow of gas therethrough. A spring is interposed between the operating knob and bonnet to load the threads between the stem and housing. It is not uncommon, however, to rely solely on the adjustable packing in such valves to obtain valve stability with respect to gas flow rate therethrough.

Gas flow control valves of the foregoing character have a number of disadvantages including misalignment between the valve element portion of the stem and the valve seat occurring as a result of bending of the stem, wear and/or manufacturing errors and which misalignment leads to the need for excessive torquing in an effort to achieve adequate sealing engagement between the seat and valve element portion of the stem when the valve is closed. Further, the need for such excessive torquing itself promotes wear of the valve element portion of the stem and/or the seat which shortens the otherwise useful life of the valve. Still further, the rotatable nature of the valve stem by threaded interengagement with the valve body promotes wear of the threads, and this too can affect alignment of the stem and seat as well as the useful life of the valve. Such rotation of the stem also causes wear of the packing, and the latter must be adjusted periodically in order to maintain stability against thread backlash which can cause changes in gas flow rate due to inadvertent external forces on the operating knob. The latter is a problem even if the stem is loaded as in the patent to Hach et al in that the packing provides a portion of the torque control of the stem against backlash. In connection with such wear and/or concentricity problems, it will be appreciated that these problems cannot be adequately overcome simply by replacing the valve stem portion of the valve assembly in that such wear affects the threads in the housing and the valve seat in the flow passageway therethrough. Accordingly, replacement of the entire valve assembly is most often required. In addition to the foregoing problems, the direct connection between the operating knob and valve stem is subject to breakage and subjects the valve stem to bending under normal abuse during use. Such abuse, whether causing bending of the stem or not, can cause the misalignment problems referred to above, or further promote such misalignment and thus the wear problems resulting therefrom.

SUMMARY OF THE INVENTION

In accordance with the present invention, a flow control valve for a gas burning torch is provided which advantageously minimizes or overcomes the foregoing problems. More particularly in this respect, the valve stem of a flow control valve in accordance with the present invention floats relative to the supporting structure and operating mechanism therefor and is free of any threaded interengagement therewith. The valve stem and thus the valve element end thereof is self-aligning with respect to the valve seat upon closure of the valve, whereby there is no excessive torquing requirement in connection with obtaining adequate sealing engagement between the valve element and seat upon closure of the valve.

Preferably, the floating characteristic is provided by supporting the valve stem in an oversized bore therefor through a sealing arrangement between the bore and stem which provides for the latter to be axially slidable toward and away from the valve seat and to be rockable transverse to the bore at a location between the opposite ends of the valve stem. Further, in connection with such rocking and self-centering features, the axially outer end of the valve stem is laterally displaceable relative to the bore and, preferably, such lateral displacement capability is achieved by interposing a ball thrust bearing between the outer end of the stem and the inner side of an operating knob by which the valve is actuated. The latter is threadably interengaged with the outer side of a sleeve providing the valve stem bore, and the valve stem is spring loaded against the operating knob through the thrust bearing, whereby the threads between the sleeve and operating knob are spring loaded to create a torque control which assures maintaining the valve in an adjusted position during operation of the torch.

All of the foregoing features provide for the valve to be highly resistant to damage and, especially in this regard, eliminates a direct connection between the valve stem and operating knob and thus eliminates bending of the valve stem and/or damage or failure of the joint between the stem and knob. Furthermore, the valve stem is non-rotating during opening and closing movements of the valve and this, together with the floating and self-aligning characteristics provide for minimal wear of the component parts, including the valve seat and valve element end of the stem, and thus a longer life for the valve than heretofore possible. In accordance with another aspect of the invention, the sleeve, valve stem and operating knob portion of the valve assembly is removable as a unit from the valve housing, thus to facilitate maintenance and/or replacement of the component parts thereof, and this capability enables repeated repair and thus extended use of the torch with which the valve is associated.

It is accordingly an outstanding object of the present invention to provide an improved manually operated flow control valve for use with a gas burning torch.

Another object is the provision of a valve of the foregoing character wherein the component parts are structured and structurally interrelated so as to minimize wearing and/or damaging interengagement between the valve element and valve seat components of the valve.

A further object is the provision of a valve of the foregoing character wherein the valve stem has a floating relationship relative to the support therefor, whereby the valve stem and the valve element thereon are self-aligning relative to the valve seat to eliminate the need for excessive torquing to achieve closing of the valve.

Yet another object is the provision of a valve of the foregoing character wherein the operating knob for controlling opening and closing movement of the valve stem is isolated from the stem in a manner which allows the operating knob to rotate relative to the stem and for the stem to move laterally relative to the operating knob.

Yet a further object is the provision of a valve of the foregoing character wherein the operating knob is threadably engaged with a stem supporting sleeve component and wherein the threads between the sleeve and operating knob are spring loaded through the valve stem and a thrust bearing between the stem and operating knob, whereby the stem is non-rotating and the threads are torqued to maintain the stem and thus the valve element in an adjusted position relative to the valve seat during operation of the torch.

Still another object is the provision of a valve of the foregoing character wherein all of the moving parts are in a sub-assembly removable as a unit from the valve housing to facilitate repair and/or replacement of the component parts and reassembly of the unit with the valve housing.

Still a further object is the provision of a valve of the foregoing character in which the relatively moving parts are structured and structurally interrelated so as to minimize wear therebetween and damage thereto, thus to promote longevity with respect to the useful life of the valve.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which:

FIGS. 4 and 5 are somewhat schematic sectional elevation views illustrating the rocking and self-centering capability of the valve stem and respectfully illustrating the valve stem in the open and closed positions.

DESCRIPTION OF A PREFERRED EMBODIMENT

Figure 1:
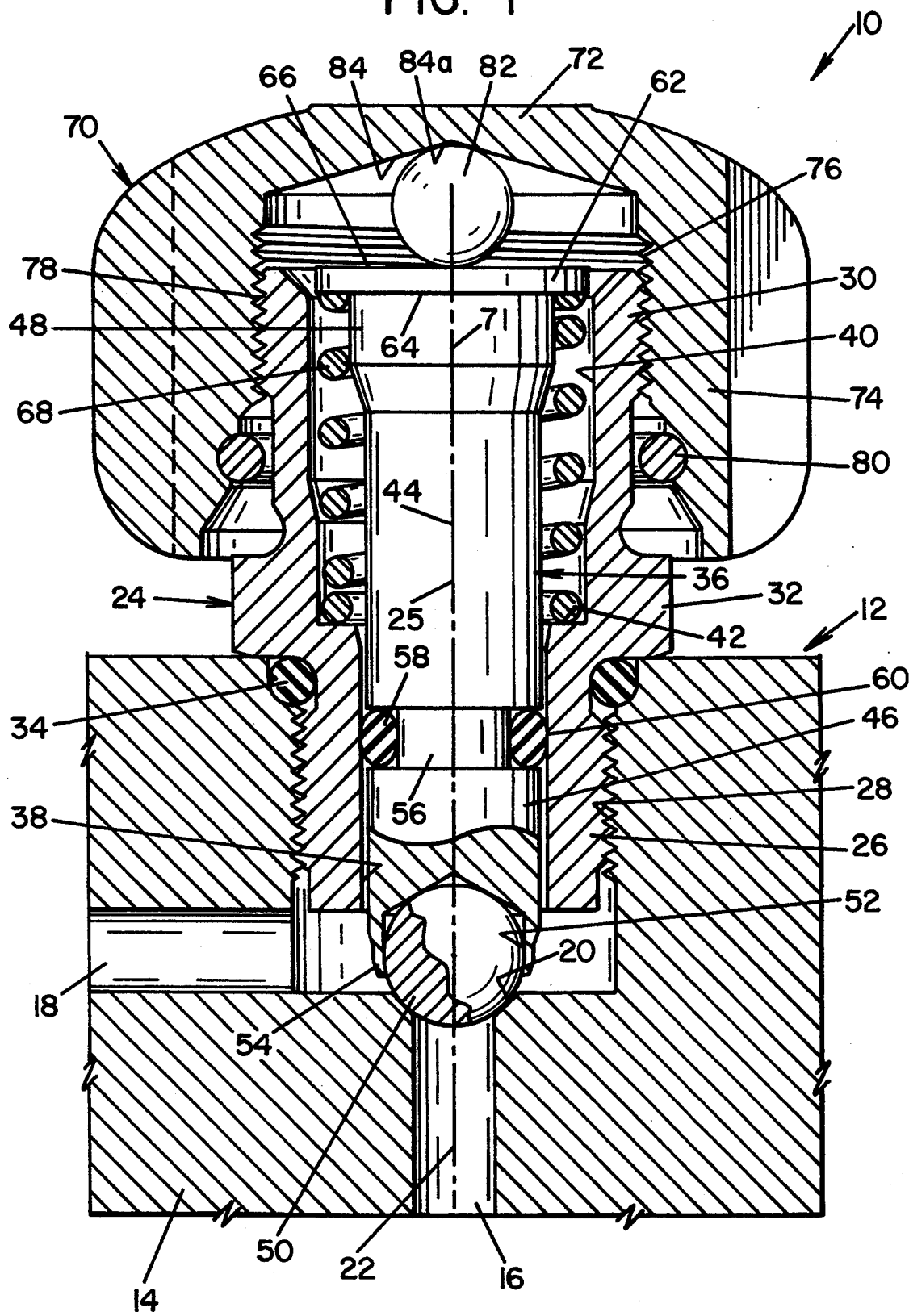
FIG. 1 is a sectional elevation view through a valve in accordance with the invention and showing the component parts of the valve in the closed position thereof.

Referring now in greater detail to the drawings wherein the showings are for the purpose of illustrating a preferred embodiment of the invention only, and not for the purpose of limiting the invention, a flow control or throttling valve 10 comprises a valve housing 12 which, as is well known and thus is not shown, is associated with the handle portion of a gas burning torch to which the torch head and nozzle are connected for the flow of gas under the control of valve 10. In the preferred embodiment, housing 12 includes a body member 14 of brass having a gas flow passageway therethrough which, with respect to the direction of gas flow therethrough, has an upstream or inlet passage portion 16 and a downstream or outlet passage portion 18 at right angles to portion 16. The upstream end of passage 16 is provided with a conical valve seat 20 having a valve seat axis 22 which is coaxial with the axis of passage portion 16. Preferably, valve seat 20 is inclined relative to axis 22 at an angle of about 45 degrees. Housing 12 further includes a sleeve member 24 having an externally threaded axially inner end 26 received in a threaded bore 28 provided therefor in body member 14. Sleeve 24 further includes an axially outer end 30 and a radially outwardly extending peripheral flange 32 intermediate the inner and outer ends thereof. Flange 32 engages against the top side of body member 14 to axially position the sleeve relative to the latter. An O-ring seal 34 of suitable elastomeric material is interposed between the axially outer end of bore 28 and the underside of flange 32 to seal against the leakage of gas across the threaded connection between bore 28 and sleeve end 26.

Figure 2:
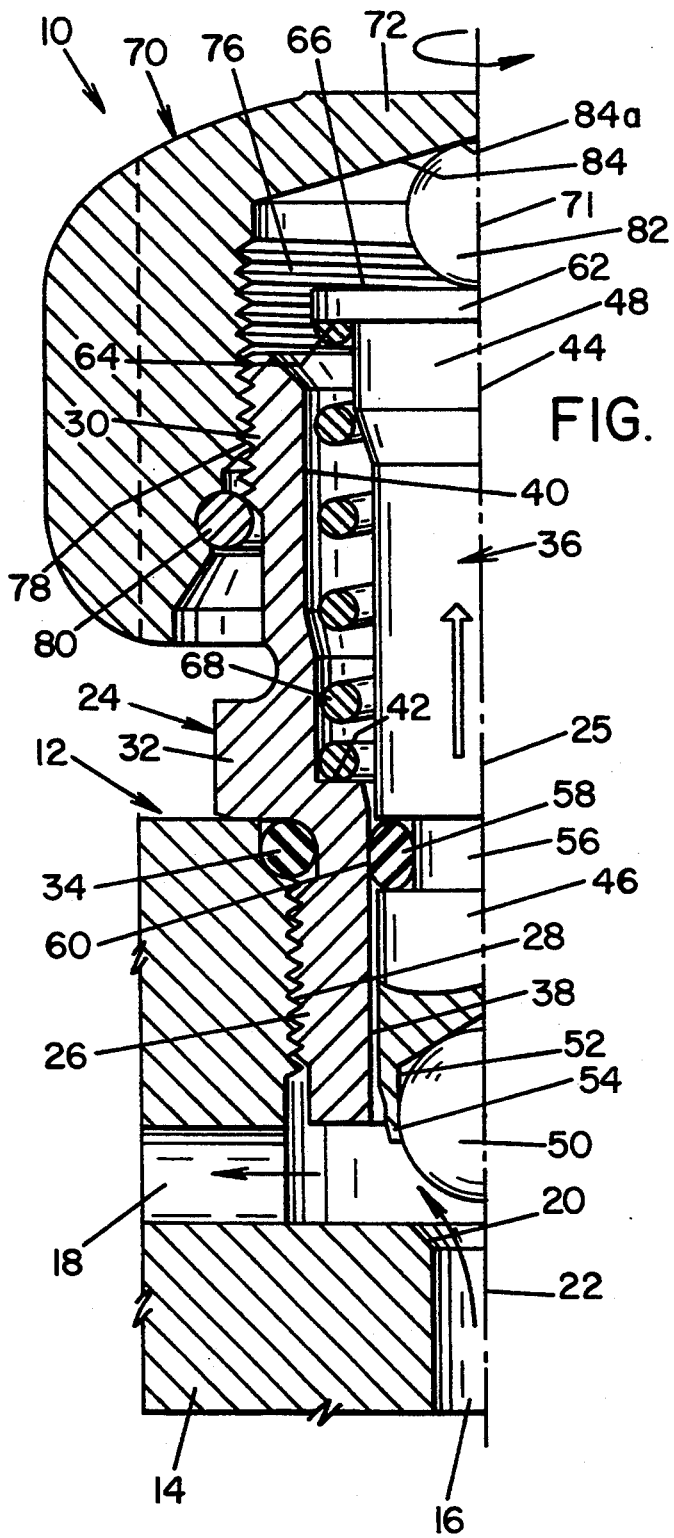
FIG. 2 is a sectional elevation view of one-half of the valve and showing the component parts of the valve in the fully open position thereof.
Figure 3:
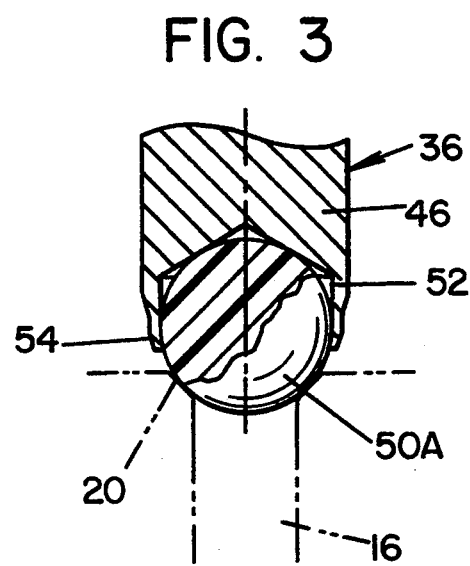
FIG. 3 is a sectional elevation view showing a modification of the valve element component.

Sleeve 24 has an opening therethrough having an axis 25 which is intended to be coincident with seat axis 22 and which supports a valve stem component 36 of the valve as set forth more fully hereinafter. The opening through sleeve 24 includes an axially inner end 38 having a given diameter, an axially outer end 40 having a diameter larger than that of the inner end, and a radially outwardly extending annular shoulder 42 therebetween. Valve stem 36 has an axis 44 which is intended to be coincident with seat axis 22, and the stem has axially inner and outer ends 46 and 48, respectively. Inner end 46 is circular in cross section and has a diameter which is less than the diameter of opening portion 38 by an amount sufficient to provide for the stem to rock relative to sleeve 24 as described more fully hereinafter. End 46 carries a valve element which, in the embodiment illustrated in FIGS. 1 and 2, is a stainless steel ball 50 which is securely retained in a bore 52 in the valve stem by swaging wall portion 54 of bore 52 thereagainst. The stainless steel ball and brass seat 20 provide for highly reliable seating. At times, however, a soft seating is preferred and, as shown in FIG. 3, a ball 50A of resinous material such as nylatron can be used for this purpose.

Axially inner end 46 of the valve stem is provided with a radially outwardly open peripheral recess 56 spaced axially outwardly from ball 50 and between the opposite ends of opening portion 38 in sleeve 24. Recess 56 receives an O-ring 58 of suitable elastomeric material which is radially compressed in recess 56 to sealingly engage against the axially opposite walls of the recess and to provide a radially outer seal and pivot face 60 which slidably and sealingly engages opening portion 38 for the purpose set forth more fully hereinafter. Axially outer end 48 of stem 36 is provided with an annular flange 62 which extends radially outwardly from end 48 to provide an annular shoulder 64. Shoulder 64 faces shoulder 42 of sleeve 24, and flange 62 has a planar axially outer surface 66 transverse to stem axis 44.

Stem 36 is biased axially outwardly relative to sleeve 24 by a coil spring 68 which surrounds the valve stem and is axially captured between shoulders 42 and 64. Axial displacement of the valve stem and thus ball valve element 50 relative to seat 20 is manually controlled by a rotatable operating knob 70. More particularly in this respect, knob 70 includes an axially outer end wall 72 extending transverse to axis 22 and an axially inwardly extending annular skirt portion 74 having internal threads 76 interengaging with external threads 78 on axially outer end 30 of sleeve 24. Knob 70 has an axis 71 coaxial with sleeve axis 25 and is rotatable in opposite directions about axes 25 and 71 to move end wall 72 axially inwardly and outwardly relative to valve seat 20. The inner side of skirt 74 is provided with a retaining ring 80 adapted to engage against the underside of the axially innermost thread 78 on sleeve 24 to limit axially outward displacement of knob 70 relative thereto. A ball thrust bearing 82 is interposed between axially inner surface 84 of end wall 72 and outer end surface 66 of stem 36. Ball 82 is intended to be positioned coaxial with sleeve axis 25 by inner surface 84 and preferably, for the latter purpose, at least the central portion 84a of surface 84 is conical and concave relative to surface 66 so as to radially capture and maintain ball 82 coaxial with axis 25.

It is believed that the following description of the operation of the valve will be understood from the foregoing description of the structure thereof. When the component parts are in the positions shown in FIG. 1, the valve is closed and ball valve element 50 engages seat 20 to close the gas flow passageway against the flow of gas therethrough from inlet 16 to outlet end 18. When operating knob 70 is rotated counterclockwise in FIG. 1 the knob advances axially outwardly along sleeve 24 and spring 68 biases stem 36 axially outwardly whereby ball valve element 50 is displaced away from valve seat 20 to open the valve as shown in FIG. 2. In the latter Figure, the valve is shown in its fully open position in which retaining ring 80 engages against the underside of the axially innermost thread 78 on the axially outer end 30 of the sleeve 24, and it will be appreciated that in use the operator will adjust the valve to a position between the closed and fully opened position in accordance with the gas flow requirement. It will be noted at this point that rotation of knob 70 is relative to stem 36 through ball thrust bearing 82, whereby stem 36 does not rotate. It will be further noted that spring 68 biases valve stem 36 against operating knob 70 through thrust bearing 82 whereby, during rotation of the operating knob, threads 76 and 78 between the operating knob and sleeve are spring loaded. This provides a torque control which gives the operator a "feel" for appropriately positioning the valve during use, thus to eliminate the need to adjust the operating knob back and forth in an effort to achieve the desired gas flow. Moreover, the spring loading eliminates back lash during the opening of the valve to assure a stable flame at the torch, and optimizes holding the operating knob against unintentional rotation relative to sleeve 24 during use of the torch. By turning operating knob 70 clockwise in FIG. 2, it will be appreciated that the operating knob advances axially inwardly relative to sleeve 24 to move valve stem 36 axially inwardly of the sleeve through thrusts bearing 82 and against the bias of spring 68 to move ball valve element 50 into engagement with seat 20 to close the valve. During axial displacement of valve stem 36 and thus ball valve element 50 between the closed and open positions of ball 50 relative to seat 20, radially outer face 60 of O-ring 58 slidably and sealingly engages opening portion 38 in sleeve 24 to facilitate axial displacement of the valve stem while sealing against the leakage of gas axially thereacross.

It should also be noted at this point that all of the moving parts of the valve are in a sub-assembly which is removable as a unit from body member 14 of the housing. In this respect, valve stem 36, spring 68, operating knob 70 and thrust bearing 82 are all supported on or within sleeve 24 and, accordingly, are removable as a unit by removing sleeve 24 from body element 14 of the housing. This advantageously facilitates removal of the sub-assembly for repair and/or replacement of the component parts thereof and for reassembly with the valve body. Furthermore, the sub-assembly structure provides for such removal and reassembly to take place repeatedly, thus to extend the life of the torch with which the valve is associated. Partly in this respect, O-ring seal 34 seals between the valve body member 14 and sleeve 24 whereby wearing of the threads on the axially inner end 26 of the stem and bore 28 is of minimal concern. Further, as will become apparent hereinafter, any misalignment between sleeve axis 25 and seat axis 22 which might result from such thread wear is overcome by the floating and self-aligning characteristic of valve stem 36 and, thus, does not affect appropriate seating of ball valve element 50 against seat 20 in connection with closing the valve. Still further, it will be noted that ball thrust bearing 82 isolates valve stem 36 from operating knob 70. This isolation, together with the floating characteristic of valve stem 36, advantageously precludes any bending or distortion of the valve stem as a result of a lateral impact against the operating knob. Again, as will become apparent hereinafter, any misalignment between sleeve axis 25 and seat axis 22 which might result from a lateral impact against operating knob 70 is compensated for by the floating characteristic of the valve stem, whereby seating of ball valve element 50 to close the valve can be achieved without having to use an excessive closing force to overcome such misalignment.

Figure 4:
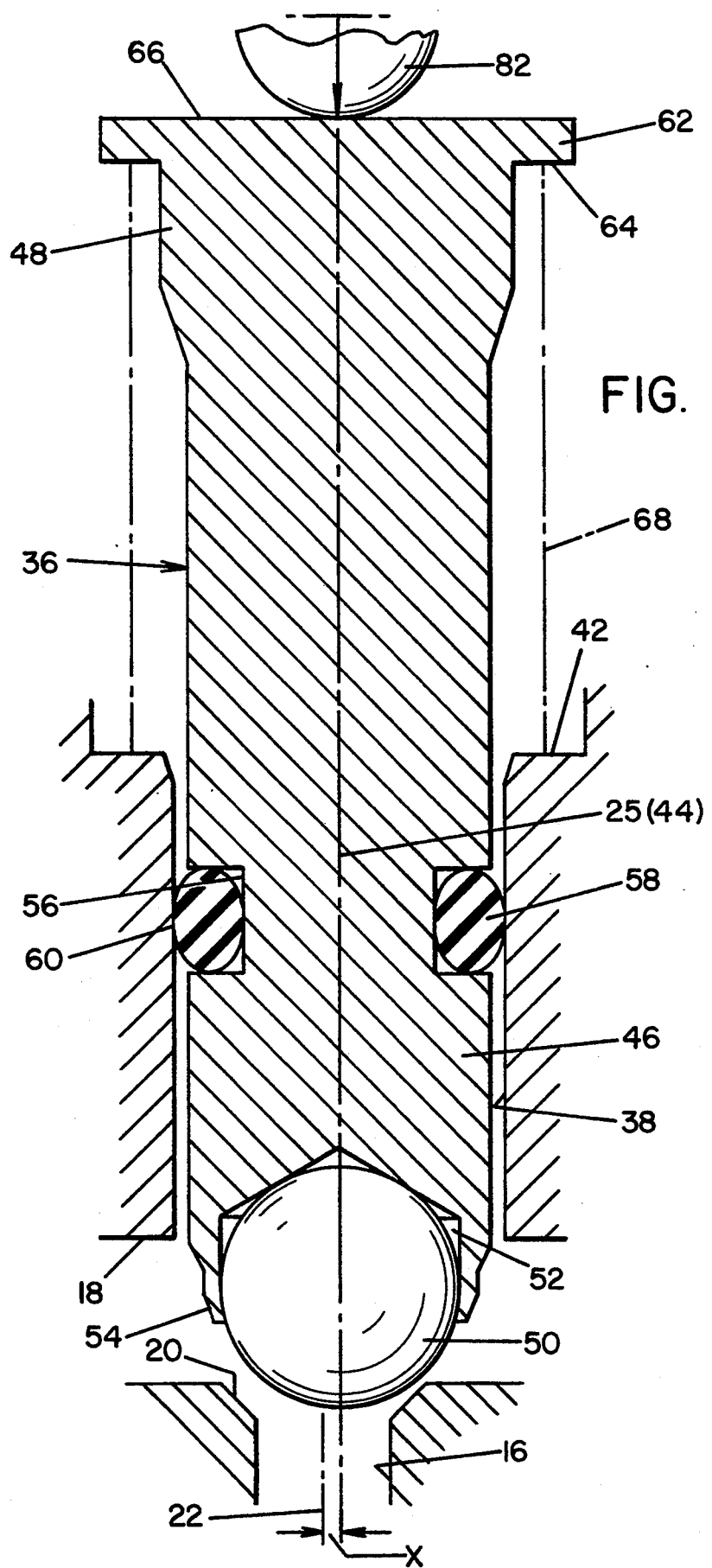

With regard to the floating and rocking characteristic of valve stem 36 referred to above, reference is made to FIGS. 4 and 5 which schematically illustrate a situation in which the desired coincidence between sleeve axis 25 and seat axis 22 does not exist as the result of, for example, a manufacturing error. In FIG. 4, wherein the valve is shown in the open position, such manufacturing error is illustrated as resulting in sleeve axis 25 being laterally offset a distance X from seat axis 22. As will be appreciated from FIG. 4, such offset provides for sleeve axis 25 and valve stem axis 44 to be coincident and laterally offset distance X from valve seat axis 22. Accordingly, ball valve element 50 is misaligned with respect to valve seat 20. When operating knob 70 is rotated to displace stem 36 toward the closed position of the valve, shown in FIG. 5, the right hand side of ball valve element 50 first engages the right hand side of valve seat 20. Upon further axial displacement of valve stem 36 in the closing direction, ball valve element 50 is cammed to the left into proper seating engagement with valve seat 20 and, in response thereto, valve stem 36 rocks clockwise such that valve stem axis 44 becomes angularly offset relative to sleeve axis 25 by an angular distance y. Such rocking of stem 36 is enabled by the diametrical relationship between opening portion 38 in sleeve 24 and axially inner end 46 of the valve stem and which relationship, as will be appreciated from FIGS. 4 and 5, provides an annular space therebetween sufficient for such rocking to take place. Such rocking is further enabled by O-ring seal 58 and the sliding and sealing interengagement of face 60 thereof with opening portion 38. Still further, thrust bearing 82 which isolates stem 36 from operating knob 70 allows the axially outer end of the valve stem to move laterally relative to bearing 82 in connection with rocking of the valve stem.

While considerable emphasis has been placed on the structure of and the structural interrelationship between the component parts of a preferred embodiment of a valve in accordance with the invention, it will be appreciated that other embodiments can be made and that changes can be made in the preferred embodiment without departing from the principals of the invention. In this respect, for example, the axially inner side of the operating knob could be contoured other than conically to position the ball thrust bearing relative to the axially outer end of the valve stem and, in connection with the thrust bearing feature, the inner side of the operating knob could be machined to provide an integral spherical surface engaging the axially outer end of the valve stem for the same purpose. Further, while it is preferred to provide for the moving parts of the valve to be mounted on and in a sleeve so as to provide a sub-assembly removable as a unit from the body portion of the valve housing, it will be appreciated that the valve housing could be machined to provide an integral structure corresponding to the sleeve in the preferred embodiment and which would function as described herein with respect to the floating and rocking characteristics of the valve stem relative thereto. Still further, it will be appreciated that the interior of the opening in the axially inner end of the sleeve in the preferred embodiment could be provided with a radially inwardly open recess receiving an O-ring seal having a radially inner face which would slidably and sealingly engage the outer surface of the axially inner end of the valve stem and relative to which the stem would be rockable for alignment of the valve element with the valve seat in the manner described herein. The foregoing and other changes as well as other embodiments of the invention will be suggested or obvious from the disclosure of the preferred embodiment herein, whereby it is to be distinctly understood that the foregoing descriptive matter is to be interpreted merely as illustrative of the invention and not as a limitation.

Thus defined herein the following is claimed:

1. A valve for controlling the flow of a gas in a gas burning torch comprising, housing means having a flow passageway therethrough, said passageway having upstream and downstream ends with respect to the direction of flow therethrough and means providing a valve seat between said upstream and downstream ends, valve stem means having a valve stem axis and axially inner and outer ends, valve element means on said inner end, support means supporting said valve stem means for axial displacement between first and second positions in which said valve element means respectively engages and disengages said valve seat to respectively close and open said passageway, means for displacing said valve stem means between said first and second positions, and said support means including means supporting said valve stem means for rocking movement transverse to said support means at a rocking location between said inner and outer ends of said stem means.

2. A valve according to claim 1, wherein said means for displacing said valve stem means includes spring means biasing said stem means toward said second position and manually operable means for displacing said stem toward said first position against the bias of said spring means.

3. A valve according to claim 1, wherein said support means includes means providing an opening receiving said valve stem means, said opening having an axis and an axially inner end portion having a surface extending about said opening axis, said valve stem means having a stem portion extending through said inner end portion of said opening and having a radially outer surface spaced radially inwardly from said surface of said opening, and means interengaging said inner end portion of said opening and said stem portion for said valve stem means to be axially slidable and transversely rockable relative to said opening.

4. A valve according to claim 3, wherein said means interengaging said inner end portion of said opening and said stem portion includes sealing means sealing the space between said surface of said opening and said outer surface of said stem portion.

5. A valve according to claim 4, wherein said sealing means includes a sealing member on one of said means providing said opening and said stem portion, said sealing member having a sealing and pivot face engaging said surface of the other of said means providing said opening and said stem portion.

6. A valve according to claim 5, wherein said sealing member is on said stem portion and said sealing and pivot face engages said surface of said opening.

7. A valve according to claim 3, wherein said means providing an opening receiving said valve stem means includes sleeve means having an axially outer end, and said means for displacing said valve stem means includes operating member means on said outer and of said sleeve means and means interengaging said operating member means and said axially outer end of said valve stem means for said outer end of said stem means to be laterally displaceable relation to said operating member means.

8. A valve according to claim 7, wherein said axially outer end of said stem means includes a first surface transverse to said valve stem axis and said operating member means includes a second surface axially spaced from said first surface, said means interengaging said operating member means and said outer and of said stem means including ball means engaging between said first and second surfaces.

9. A valve according to claim 8, wherein said first surface is planar and said second surface is concave relative to said first surface.

10. A valve according to claim 8, wherein said operating member means includes an operating knob threadably interengaged with said outer end of said sleeve means for rotation in opposite directions about said sleeve means, rotation in one of said directions displacing said valve stem means toward said first position.

11. A valve according to claim 10, and spring means biasing said stem means toward said second position in response to rotation of said operating knob in the other of said opposite directions.

12. A valve according to claim 11, wherein said first surface is planar and said second surface is concave relative to said first surface.

13. A valve according to claim 12, wherein said valve element means includes a ball on said inner end of said stem means.

14. A valve according to claim 11, wherein said means interengaging said inner end portion of said opening and said stem portion includes sealing means sealing the space between said surface of said opening and said outer surface of said stem portion.

15. A valve according to claim 14, wherein said sealing means includes a sealing member on one of said means providing said opening and said stem portion, said sealing member having a sealing and pivot face engaging said surface of the other of said means providing said opening and said stem portion.

16. A valve according to claim 15, wherein said sealing member is on said stem portion and said sealing and pivot face engages said surface of said opening.

17. A valve according to claim 16, wherein said first surface is planar and said second surface is concave relative to said first surface.

18. A valve according to claim 17, wherein said valve element means includes a ball on said inner end of said stem means.

19. A valve according to claim 1, wherein said support means supporting said valve stem means includes sleeve means having an axially outer end, and said means for displacing said valve stem means includes operating member means on said outer end of said sleeve means and means interengaging said operating member means and said axially outer end of said valve stem means for said outer end of said valve stem means to be laterally displaceable in relation to said operating member means.

20. A valve according to claim 19, wherein said axially outer end of said stem means includes a first surface transverse to said stem axis and said operating member means includes a second surface axially spaced from said first surface, said means interengaging said operating member means and said outer end of said stem means including ball means engaging between said first and second surfaces.

21. A valve according to claim 20, wherein said operating member means includes an operating knob threadably interengaged with said outer end of said sleeve means for rotation in opposite directions about said sleeve means, rotation in and of said directions displacing said valve stem means toward said first position.

22. A valve according to claim 21, and spring means biasing said stem means toward said second position in response to rotation of said operating knob in the other of said opposite directions.

23. A valve according to claim 22, wherein said first surface is planar and said second surface is concave relative to said first surface.

24. A valve for controlling the flow of a gas in a gas burning torch comprising, housing means having a flow passageway therethrough, said passageway having upstream and downstream ends with respect to the direction of flow therethrough and means providing a valve seat between said upstream and downstream ends, said valve seat having an axis, said housing means including sleeve means providing a valve stem opening having an axis coaxial with said axis of said valve seat, valve stem means in said opening and having axially inner and outer ends, valve element means on said inner end, said sleeve means having an axially outer end, operating knob means threadably interengaged with said outer end of said sleeve means for rotation in opposite directions about said axis of said opening, means interengaging said knob means and said outer end of said stem means for rotation of said knob means in one of said directions to displace said stem means axially inwardly to a first position in which said valve element means engages said seat to close said passageway, spring means biasing said stem means axially outwardly to a second position in response to rotation of said knob means in the other of said opposite directions, said valve element means in said second position of said stem means disengaging said seat to open said passageway, and means (disposed within said stem opening for) supporting said valve stem means in said opening for rocking movement transverse to said axis of said opening at a rocking location between said inner and outer ends of said valve stem means when said valve element means disengages said seat.

25. A valve according to claim 24, wherein said valve stem opening has a circular axially inner end portion having a first diameter and said valve stem means has a circular portion having a second diameter smaller than said first diameter, said means supporting said valve stem means for rocking movement including annular means on said circular portion of said valve stem means having a radially outer face slidably engaging said inner end portion of said valve stem opening.

26. A valve according to claim 25, wherein said circular portion of said valve stem means has a radially outwardly open annular recess therein, said annular means including annular seal ring means in said recess.

27. A valve according to claim 24, wherein said knob means includes a knob surface transverse to said axis of said opening, said stem means has a stem axis, said outer end of said stem means includes a stem surface transverse to said stem axis, and said means interengaging said knob means and said outer end of said stem means includes a ball member between said knob and stem surfaces.

28. A valve according to claim 27, wherein said knob means has a knob axis coaxial with said axis of said opening and said knob surface includes positioning means for positioning said ball member coaxial with said knob axis.

29. A valve according to claim 28, wherein said knob surface is concave with respect to said stem surface and includes a control portion of generally conical contour providing said positioning means.

30. A valve according to claim 27, wherein said axially outer end of said sleeve means has a threaded radially outer surface and said knob means includes internally threaded skirt means extending axially inwardly from said knob surface in threaded engagement with said threaded outer surface.

31. A valve according to claim 30, wherein said valve stem opening has a circular axially inner end portion having a first diameter and said valve stem means has a circular portion having a second diameter smaller than said first diameter, said means supporting said valve stem means for rocking movement including annular means on said circular portion of said stem means having a radially outer face slidably engaging said inner end portion of said valve stem opening.

32. A valve according to claim 31, wherein said valve stem opening has a circular axially outer end portion having a third diameter greater than said first diameter and providing an annular shoulder between said axially outer and inner end portions of said opening, said axially outer end of said valve stem means including an annular flange axially facing said shoulder, said spring means including a spring member surrounding said stem means between said shoulder and said flange.

33. A valve according to claim 32, wherein said circular portion of said valve stem means has a radially outwardly open annular recess therein, said annular means including annular seal ring means in said recess.

34. A valve according to claim 33, wherein said knob surface is concave with respect to said stem surface and includes a central portion of generally conical contour, said central portion positioning said ball member coaxial with said axis of said valve stem opening.

35. A valve according to claim 34, wherein said valve element means on said inner end of said valve stem means includes a ball member.

* * * * *